United States Patent Office 3,284,187

Patented Nov. 8, 1966

3,284,187

DISPERSANT COMPOSITIONS AND TOXICANT CONCENTRATES CONTAINING THE SAME

Paul L. Lindner, Evanston, Ill., assignor to Witco Chemical Company, Inc., New York, N.Y., a corporation of Delaware No Drawing. Filed Dec. 10, 1962, Ser. No. 243,577
16 Claims. (Cl. 71—3)

My invention relates to the production of new and useful dispersant compositions and to liquid biocidal toxicant compositions, particularly in the form of toxicant concentrates, containing said dispersants.

It has been found to be highly desirable, in certain situations, to be able to apply to an earth soil, in which plant or vegetable life is grown or contemplated to be grown, both water-soluble fertilizer material and also a desired pesticide, to wit, water-insoluble organic solvent-soluble insecticide, weed killer, or soil fumigant, hereafter generically called biocidal toxicant, in the form of a single composition. Efforts to provide such a composition, for instance, in the form of a stable, mobile, pourable or pumpable liquid emulsion, by simple mixing, present certain serious problems. The water-soluble fertilizer materials comprise water-soluble compounds, typical examples of which are potassium chloride, potassium nitrate, ammonium nitrate, ammonium sulphate, potassium sulphate, ammonium phosphate, and urea, with or without supplemental materials.

When dissolved in water to form strong solutions, particularly solution approximating concentrated solutions, constituting the aqueous phase, and admixed with biocidal toxicant concentrates containing biocidal toxicants dissolved in organic solvents and insoluble in said aqueous phase, or solutions of such biocidal toxicants in organic solvents wherein said latter solutions, constituting the oleaginous phase, are insoluble in said aqueous phase, unstable dispersions form which readily and promptly separate out in the form of layers. Efforts to emulsify such aqueous phases and such oleaginous phases by means of usual types of emulsifying agents used in the toxicant emulsion field have proved entirely unsatisfactory. Non-ionic emulsifiers of the type of the polyoxyethylene derivatives of lipophillic materials, for instance, polyethylene glycol ethers of sorbitan monostearate, polyethylene glycol ethers of sorbitan monooleate, alkyl phenoxy polyoxyethanols, iso-octyl phenol polyoxyethylene ethers, and the like, have been found to be ineffective since they are salted out by the strong electrolytes in the high concentrations used in liquid fertilizer solutions. Similarly, higher alkyl aryl sulfonates, such as alkali metal, ammonium, magnesium or calcium salts of dodecyl benzene sulfonate, and the like, have likewise been found to be entirely unsatisfactory, whether used in conjunction with the non-ionic emulsifiers of the type mentioned above or by themselves.

The problem of providing satisfactory emulsions of aqueous liquid fertilizer solutions, particularly strong solutions, containing upwards of 20% of water-soluble fertilizer ingredients such as the monovalent and polyvalent ionic compounds described above and up to saturated aqueous solutions of said fertilizer solutions, with water-insoluble organic solvent-soluble biocidal toxicants has, so far as I am aware, not remotely been solved by others despite intensive efforts to do so. In certain instances, by means of special combinations of ingredients, it has been possible to prepare liquid fertilizer-biocidal toxicant compositions, but these must be prepared immediately prior to being used and must be used promptly since, among other things, their stability is of extremely short duration. Other special combinations of ingredients have been suggested, for instance, which are of use in liquid fertilizer-biocidal toxicant compositions but only if the liquid fertilizer contains trivalent phosphate ions and urea. In the presence of monovalent ions such as chlorides or nitrates, such latter compositions are of no commercial value because the emulsifying action of the combination of ingredients is destroyed.

I have discovered new and useful biocidal toxicant concentrates (and dispersant compositions for use therein) which, when admixed, by simple mixing, with liquid fertilizer compositions in the form of strong aqueous solutions, say in excess of 20% concentration up to saturation, produce homogeneous emulsions or dispersions which remain usable for periods of the order of at least several hours. My invention makes it unnecessary to premix the biocidal toxicant concentrate with water just prior to admixing it with the liquid fertilizer solution, as is required with certain heretofore known biocidal toxicant concentrates. All that is necessary, in the case of biocidal toxicant concentrates made in accordance with my invention, is simple mixing or agitation with the liquid fertilizer solution. Moreover, my novel biocidal toxicant concentrates can effectively be used with liquid fertilizer compositions irrespective of whether the latter contain monovalent or polyvalent ions, and they are also usable with more dilute solutions of liquid fertilizer as, for instance, those containing of the order of 10 to 15% of solids. Thus, they have a universality of utility which is a most important practical consideration.

I have discovered that if there are utilized, in admixture, certain materials falling into two separate classes, and which are employed in certain ratios with respect to each other, all as is hereafter described in detail, a synergistic effect is obtained which brings about the entirely unpredictable and unexpected results which are achieved by my present invention.

The first of these ingredients, which, for convenience, may be called the (a) ingredient, comprises certain oil soluble or organic non-polar solvent soluble salts of higher molecular weight sulfocarboxylic acid amides of taurine or lower alkyl ($C_1$ to $C_4$) substituted taurines, especially N-methyl taurine, particularly α-sulfo higher fatty acid amides of taurine and N-methyl taurine, the sulfocarboxylic or α-sulfo fatty acid radicals of which contain at least 8 and better still, from 12 to 18 carbon atoms. The (a) ingredient can, in general, be represented by the formula $$\begin{array}{l} \qquad\qquad\quad R^1 \\ \qquad\qquad\quad | \\ R-CO-N-C_2H_4-SO_3M \\ | \\ SO_3M' \end{array}$$

where R is a higher molecular weight straight or branched chain radical, substituted or unsubstituted, containing from 8 to 24 carbon atoms, especially a straight chain unsubstituted aliphatic hydrocarbon radical containing from 12 to 18 carbon atoms, $R^1$ is hydrogen or a lower alkyl radical ($C_1$ to $C_4$), and M and M' are members selected from the group consisting of alkali metals (including ammonium) and organic substituted ammonium radicals with the proviso that at least one of M and M' is an organic substituted ammonium radical, and with said $SO_3M'$ radical advantageously being in the alpha position to said CO— radical. It is especially desirably in substantially anhydrous form as utilized in the dispersant concentrate compositions of my invention.

The higher molecular weight sulfocarboxylic acids whose amides with taurine (or the lower alkyl taurines), in the form of particular salts thereof, are utilized as the (a) ingredient may contain one or more sulfonic radicals. There may, however, also be other substituents in the molecule of said higher molecular weight carboxylic acid, in addition to the sulfonic group, as, for instance, chlorine, bromine, amino and carboxyl. Especially satisfactory for use in the production of the esters constituting the (a) ingredient, are the alpha-sulfonated higher fatty acids as, for example, alpha-sulfonated lauric acid; alpha-sulfonated myristic acid; alpha-sulfonated palmitic acid; sulfonated oleic acid having the sulfonic group at the double bond position of the oleic acid; alpha-sulfonated oleic acid; alpha-sulfonate dstearic acid; alpha-sulfonated mixed fatty acids derived from triglycerides oils and fats, hydrogenated or not, such as tallow coconut oil, babassu oil, soya bean oil, corn oil, palm nut oil, cottonseed oil, castor oil, and whale oil; $\alpha$-sulfo dimeric acids derived from dimers of $C_8$, $C_{10}$ and $C_{12}$ fatty acids; $\alpha$-sulfo phenyl stearic acid; 9,10-dihydroxy $\alpha$-sulfo stearic acid; 9,10-dichloro $\alpha$-sulfo stearic acid; disulfonated oleic acid in which one of the sulfonic groups is in the alpha position to the carboxyl group; and the like.

$R^1$, in the case of taurine, is hydrogen. It may, however, as indicated, be $CH_3$, $C_2H_5$, $C_3H_6$ or $C_4H_8$. For reasons of commercial availability, and for other reasons as well, it is especially preferred that $R^1$ be hydrogen or methyl.

The (a) ingredients are utilized, pursuant to my invention, in the form of certain classes of salts, all as is more particularly pointed out hereafter.

The salt-forming radicals represented by M or M' comprise, in the case of M, alkali metals (which term is here used to mean sodium, potassium, lithium and ammonium); and, in the case of M and M', organic substituted ammonium radicals. The latter, which most advantageously are water-soluble lower molecular weight amines, may be selected from a wide group, typical examples of which are dimethylamine; diethylamine; triethylamine; propylamine; monoisopropylamine, diisopropylamine, triisopropylamine, anad commercial mixtures of said isopropylamines; butyl amine, amyl amine; monoisopropanolamine, diisopropanolamine, triisopropanolamine and commercial mixtures of said isopropanolamines; ethanolamines such as monoethanolamine, diethanolamine, triethanolamine, and commercial mixtures thereof; polyamines such as aminoethyl ethanolamine, ethylenediamine, diethylenetriamine, hydroxyethyl ethylenediamine, and hexamethylenediamine; hexylamine; cyclohexylamine; dimethylbenzylamine, benzylamine; morpholine; methylcyclohexylamine; alkyl alkanol amines such as ethyl diethanolamine and diethyl ethanolamine; furfurylamine; piperidine; 2-amino-2-methyl-1-propanol; 2-amino-1-butanol; methyl piperidine, and the like; as well as long chain amines such as octyl amine, dodecyl amine, hexadecyl amine, octadecyl amine, soya amines, soyapropyl amines, and the like; and compatible mixtures of any two or more thereof.

With reference to said (a) ingredient, the said salt may be the organic substituted ammonium di-salt, that is, where both M and M' are organic substituted ammonium radicals, which may be the same or different organic substituted ammonium radicals; or the said salt may a half alkali metal and half organic substituted ammonium salt which is the case where M is an alkali metal and M' is an organic substituted ammonium radical.

Illustrative examples of said (a) ingredient are the following (which include, also, the isomers thereof):

(1) $$CH_3-(CH_2)_9-\underset{\displaystyle SO_3H.H_2NCH=(CH_3)_2}{\underset{|}{CH}}-CO-NH-C_2H_4-SO_3Na$$

Half sodium half isopropylamine salt of alphasulfo lauric acid amide of taurine (2) $$CH_3-(CH_2)_9-\underset{\displaystyle SO_3NH_4}{\underset{|}{CH}}-CO-NH-C_2H_4-SO_3H.H_2N-CH=(CH_3)_2$$

Half ammonium half isopropylamine salt of alpha-sulfo lauric acid amide of taurine (3) $$CH_3-(CH_2)_{15}-\underset{\displaystyle SO_3H.H_2N-CH_2-CH=(CH_3)_2}{\underset{|}{CH}}-CO-N(CH_3)-C_2H_4-SO_3NH_4$$

Half ammonium half isobutylamine salt of alpha-sulfo stearic acid amide of N-methyl taurine (4) $$CH_3-(CH_2)_9-\underset{\displaystyle SO_3H.H_2N-CH=(CH_3)_2}{\underset{|}{CH}}-CO-N(CH_3)-C_2H_4-SO_3H.H_2N-CH=(CH_3)_2$$

Isopropylamine di-salt of alpha-sulfo lauric acid amide of N-methy taurine (5) 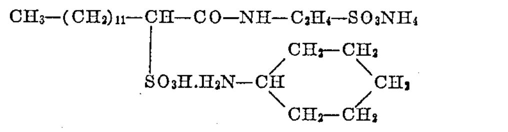

Half ammonium half cyclohexylamine salt of alpha-sulfo myristic acid amide of taurine (6) $$\underset{\displaystyle SO_3H.H_2N-CH=(CH_3)_2}{\underset{|}{R}}-CO-NH-C_2H_4-SO_3H.H_2N-CH=(CH_3)_2$$

(where R is the oleic acid radical)

Isopropylamine di-salt of alpha-sulfonated oleic acid amide of taurine (7) $$CH_3-(CH_2)_9-\underset{\displaystyle SO_3H.H_2N-C_2H_4NH_2}{\underset{|}{CH}}-CO-N(C_2H_5)-C_2H_4-SO_3K$$

Half potassium half ethylene diamine salt of $\alpha$-sulfo lauric acid amide of N-ethyl taurine (8) $$CH_3-(CH_2)_7-\underset{\displaystyle SO_3H.H_2N-CH=(CH_3)_2}{\underset{|}{CH}}-(CH_2)_7-\overset{\displaystyle SO_3H.H_2N-CH=(CH_3)_2}{\overset{|}{CH}}-CO-NH-C_2H_4-SO_3H.H_2N-CH=(CH_3)_2$$

Isopropylamine tri-salt of disulfonated oleic acid amide of taurine

While the (a) ingredient can be prepared by various methods, the following example is illustrative of procedures which have been found to be very satisfactory.

*Example I*

180 g. of alpha-sulfopalmitic acid, 85 g. of the sodium salt of taurine and 200 g. of benzene were admixed and heated, with stirring, to distill off water as an azeotrope, benzene being added to replace the water distilled off. After cooling to 25 degrees C., the reaction product was neutralized with 30 g. of isopropylamine. The benzene was then distilled off and the residue was extracted with isopropyl alcohol. The isopropyl alcohol was then distilled off leaving 160 g. of a waxy material which, on analysis, was shown to be the half sodium half isopropylamine salt of the alpha-sulfopalmitic acid amide of taurine, the formula of which is $$C_{14}H_{29}-\underset{\displaystyle SO_3M'}{\underset{|}{CH}}-CO-NH-C_2H_4-SO_3M$$

where M and M' are from the group of sodium and isopropylammonium.

The second of said ingredients, which may, for convenience, be called the (b) ingredient, is an amine salt of an alkyl benzene sulfonic acid in which the alkyl radical contains from 12 to 18 carbon atoms. The alkyl radical, which is advantageously predominantly a single higher alkyl radical, may be derived from polypropylenes, kerosene fractions, or the like, contains predominantly from 12 to 18 carbon atoms, and, especially, predominantly from 12 to 15 carbon atoms. The benzene nucleus may also contain lower alkyl substituents, provided that the number of carbon atoms in such lower alkyl constituents is in the range of from 1 to 3 and the number of such lower alkyl substituents does not exceed 2. The number of sulfonic acid radicals in the benezene nucleus may be 1 or 2, but, especially, there is only approximately one sulfonic acid radical in the benzene nucleus.

Certain of the higher alkyl benzene sulfonic acids which, in the form of their organic amine salts, are employed as the (b) ingredient in the practice of my invention can be represented by the formula

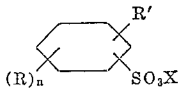

where R is a lower alkyl radical containing from 1 to 3 carbon atoms, such as methyl, ethyl, propyl and isopropyl, R′ is a higher alkyl radical containing from 12 to 18 carbon atoms and especially from 12 to 15 carbon atoms, $n$ is zero to 2, and X is an organic amine cation.

Typical examples of the organic amines whose salts of the higher alkyl benzene sulfonic acids are employed as the (b) ingredient in accordance with my present invention are those which have been mentioned above as being representative of M′ in the general formula for the (a) ingredient. Particularly preferred are the alkyl amines containing from 1 to 6 carbon atoms and especially preferred is isopropyl amine. Typical or illustrative examples of the organic amine salts of the higher alkyl benzene sulfonic acids the use of which is encompassed by my invention are the following: diisopropanolamine salt of dodecyl benzene mono-sulfonic acid; isopropylamine salt of dodecyl benzene mono-sulfonic acid; diisopropylamine salt of dodecyl toluene mono-sulfonic acid; furfurylamine salt of pentadecyl benzene mono-sulfonic acid; cyclohexylamine salt of dodecyl benzene mono-sulfonic acid; diisopropylamine salt of dodecyl isopropyl benzene sulfonic acid; morpholine salt of octadecyl benzene disulfonic acid; and mixtures of two or more thereof. The isopropylamine salt of dodecyl benzene mono-sulfonic acid is unusually satisfactory as the (b) ingredient and its use, in the combinations here involved, represents an important, though limited, embodiment of my invention.

It will be understood, of course, that mixtures of any two or more of the (a) and any two or more of the (b) ingredients can be employed in the practice of my present invention; and, also, that said (a) and (b) ingredients can be utilized in the form of impure reaction products containing high percentages of the active constituents thereof.

The biocidal toxicants which are used in accordance with my present invention and which, as stated above, comprise insecticides and soil fumigants, may be selected from a wide group typical examples of which are "Aldrin" (1,2,3,4,10,10-hexachloro-1, 4,4a,5,8,8a-hexahydro-1,4,5,8-dimethanonaphthalene); "Dieldrin" (1,2,3,4,10,10-hexachloro-6,7-epoxy,1,4,4a,5,6,7,8,8a - octahydroxy - 1,4-endo-exo-5,8-dimethanonaphthalene); "Lindane" (gamma isomer of benzene hexachloride); "Heptachlor" (1,4,5,6, 7,8,8-heptachloro-3a,4,7,7a-tetrahydro-4,7-endo - methanoindene); "Nemagon" (1,2 - dibromo - 3 - chloropropane); ethylene dibromide; DDT; organic thiocyanates such as B-butoxy, B′-thiocyanodiethyl ether; bornyl thiocyanoacetate; trichlorobenzene; propyl, butyl, and amyl ethers of pentachlorophenol, and the like, and compatible mixtures of any two or more thereof. Of especial importance are "Aldrin," "Dieldrin," "Lindane," "Heptachlor," and "Nemagon."

The organic solvent which is utilized in the preparation of the biocidal toxicant concentrates of my present invention, and in which the biocidal toxicant is soluble, may be selected from a known group of such organic solvents. Such organic solvents are of the type which are insoluble in the aqueous phase and, at least in most cases, will be per se insoluble in water. For convenience, said organic solvents are referred to herein as being "water-insoluble," and the same is true of the biocidal toxicants, although the criterion is essential insolubility in the aqueous phase of the emulsion. These include, for instance, aromatic hydrocarbon solvents, or blends thereof with paraffinic or naphthenic solvents. Examples of such solvents are kerosene; light refined mineral oil, methylnaphthalenes such as monomethyl naphthalene, dimethyl naphthalene and trimethyl naphthalene; ethyl naphthalene; 2-methylpentanediol-1,2; dipropylene glycol methyl ethers; benzene; toluene, aromatic naphthas, xylene, tetrahydronaphthalene, cyclohexane, and the like. These and various other organic solvents are frequently sold under trade names, such as "Cyclosol 53," which is an aromatic petroleum fraction comprising methylated naphthalenes; and "Sovacide 544C" which is an aromatic petroleum oil containing methylated naphthalenes.

The (a) and (b) ingredients are incorporated into solutions of the biocidal toxicants in the selected organic solvent or mixtures of organic solvents to produce biocidal toxicant concentrates. Typical of such biocidal toxicant concentrates are so-called concentrates containing, for instance, 2 pounds "Heptachlor" per gallon; 1.5 pounds "Dieldrin" per gallon; 1 pound gamma equivalent benzene hexachloride per gallon; and 45% "Nemagon" concentrates. The content of the total of the (a) and (b) ingredients, by weight of the biocidal toxicant concentrate, will fall within the range of 3 to 30%, but ordinarily, from 6 to 15%, and, particularly, from 8 to 12%, will be found quite satisfactory for most purposes. The relative proportions of the (a) and (b) ingredients, or, in other words, the weight ratio of the (a) to the (b) ingredient, should be at least 2 to 1, and is usually in the range of about 2 to about 20, preferably on an average of about 4 to 10, parts of the (a) ingredient to 1 part of the (b) ingredient. The upper limit of the (a) ingredient may, if desired, be at least several times the values recited above. Within the limits stated, the proportions of ingredients may be varied in order to obtain optimum results in connection with any particular liquid fertilizer solution.

The percentages or proportions of the (a) and (b) ingredients, as set forth above, are predicated on their being pure substances. In actual commercial practice, the (a) and (b) ingredients as prepared will not be in pure form and, indeed, it is unnecessary that they be used in pure form. Thus, for instance, in the case of the (a) ingredient used in Example A, it may be prepared in the form of an approximately 50% or 60% to 65% or 75% active product, and the (b) ingredient used in Example A is commonly prepared in the form of an approximately 95% active product. In using such unpurified reaction mixtures comprising the (a) and (b) ingredients, account should be taken of the active ingredient content thereof in selecting the percentages thereof to be used.

The liquid fertilizer solutions (with which the hereinabove described biocidal toxicant concentrates are admixed to form homogeneous emulsions or dispersions which are usable over periods of at least several hours) are, per se, well known in the art. They comprise aqueous solutions, usually strong or concentrated aqueous solutions even up to saturation, of water-soluble compounds which fall into the category of providing at least one of the elements potassium, nitrogen and phosphorus, including, among others, as previously pointed out, potassium chloride, potassium nitrate, potassium sulphate, ammonium nitrate, ammonium sulphate, ammonium phosphate, aqueous ammonia, and the like, as well as organic water-soluble fertilizer materials particularly in conjunction with the inorganic water-soluble salts, such as those mentioned above, an especially preferred example of such organic water-soluble fertilizer material being urea. The liquid fertilizers, which will normally include one or more of the aforementioned materials, may be standardized as to their nitrogen, phosphorus (as $P_2O_5$) and potassium (as $K_2O$) contents. Typical examples of liquid fertilizer solutions, which can be used in conjunction with the novel biocidal toxicant concentrates of my invention, are shown in a bulletin entitled "Preparation of Liquid Fertilizers," Second Edition, published by Victor Chemical Works, Chicago, Illinois.

The following examples are illustrative of biocidal toxicant concentrates, and dispersant compositions for use therein, falling within the scope of my invention. Other specific embodiments will readily occur to those skilled in the art in the light of the guiding teachings and principles disclosed herein. All parts listed are by weight.

*Example A*

| | Parts |
|---|---|
| Aldrin | 47 |
| Xylene | 43 |
| Half sodium half isopropylamine salt of α-sulfo lauric acid amide of N-methyl taurine (60% active) | 7.8 |
| Isopropylamine salt of dodecyl benzene sulfonic acid (95% active) | 2.2 |

*Example B*

| | Parts |
|---|---|
| Dieldrin | 18 |
| Xylene | 72 |
| Isopropylamine di-salt of α-sulfo lauric acid amide of taurine (65% active) | 8 |
| Isopropylamine salt of dodecyl benzene sulfonic acid (95% active) | 2 |

*Example C*

| | Parts |
|---|---|
| "Heptachlor" | 32 |
| "Sovacide 544 C" | 58 |
| Isopropylamine di-salt of α-sulfo oleic acid amide of N-methyl taurine | 7.5 |
| Isopropylamine salt of dodecyl benzene sulfonic acid | 2.5 |

*Example D*

| | Parts |
|---|---|
| Half sodium half isopropylamine salt of α-sulfo lauric acid amide of N-methyl taurine | 7.8 |
| Isopropylamine salt of dodecyl benzene sulfonic acid | 2.2 |

*Example E*

| | Parts |
|---|---|
| Isopropylamine di-salt of α-sulfo lauric acid amide of N-methyl taurine | 8 |
| Isopropylamine salt of dodecyl benzene sulfonic acid | 2 |

*Example F*

| | Parts |
|---|---|
| Isopropylamine di-salt of α-sulfo lauric acid amide of N-methyl taurine | 9 |
| Isopropylamine salt of dodecyl benzene sulfonic acid | 2.5 |
| Kerosene | 53 |
| "Cyclosol 53" (organic solvent) | 35 |

The weight ratio between the oleaginous phase, represented by the toxicant concentrate, and the aqueous phase, represented by the strong or concentrated aqueous solution of fertilizer ingredients, can range from 1 to 1 or up to 1 to 10. However, in the usual case of the use of the biocidal toxicant concentrates of my present invention, the amount of the liquid fertilizer solution will be many times the amount of the biocidal toxicant concentrate. In other words, most commonly the aqueous phase of the emulsion will be present in large excess over the oleaginous phase present in the biocidal toxicant concentrate. While such excess may vary somewhat, in the usual case it will be in the range of about 25 or 30 to 60 or even more times that of the oleaginous phase, but will usually be from about 30 to 40 times that of the oleaginous phase, all in terms of parts by weight.

In the use of the biocidal toxicant concentrates of my invention, the same are simply admixed with the aqueous or liquid fertilizer solution, with suitable agitation. For instance, 2.5 parts of the toxicant concentrate of Example A are admixed, with stirring, with 97.5 parts of a standard liquid fertilizer solution (8–24–0 diammonium phosphate solution). In another typical example, 3 parts of the toxicant concentrate of Example B are admixed with 97 parts of a standard liquid fertilizer solution, 45% ammonium nitrate plus 28% of 75% $H_3PO_4$ solution. Again, 3.3 parts of the toxicant concentrate of Example D are admixed with 96.7 parts of a liquid fertilizer solution made up of 44.3 parts ammonium nitrate, 35.4 parts urea, and 20.3 parts of water. Other illustrative commercial types of liquid fertilizer solutions with which my novel biocidal toxicant concentrates can be used are the so-called 8–8–8 (derived from ammonium phosphate, potassium chloride and urea), and 10–20–0 (derived from ammonium phosphate and urea).

The dispersant compositions of the present invention have unusual utility in connection with the production of toxicant concentrates for use in conjunction with aqueous solutions containing high concentrations of fertilizer ingredients, all as has been described above in detail. They have a broader utility, however, namely, in connection with the production of stable emulsions of oleaginous and aqueous materials in the presence of high concentrations of ionizable materials, notably inorganic salts. It is well known that the presence of ionizable materials such as sodium chloride, sodium sulfate, magnesium chloride, magnesium sulfate and other monovalent and polyvalent inorganic salts, in oleaginous-aqueous emulsion systems, very seriously affects the stabilities of such emulsions, especially where the concentration of said salts in the aqueous phase is of the order of even a few percent. The dispersant compositions of this invention make possible the production of stable emulsions even under the highly adverse environmental conditions of high concentrations of strongly ionizable salts.

Where reference is made to water-insoluble biocidal toxicants, it will be understood that such is intended to encompass biocidal toxicants which are insoluble in water as well as biocidal toxicants which are insoluble in the liquid fertilizers per se irrespective of their solubility in water per se.

What I claim as new and desire to protect by Letters Patent of the United States is:

1. A dispersant composition, soluble in organic solvent solutions of water-insoluble biocidal toxicants, comprising (a) a compound represented by the formula $$\underset{\underset{SO_3M'}{|}}{R}-CO-\overset{\overset{R^1}{|}}{N}-C_2H_4-SO_3M$$

where R is higher molecular weight aliphatic containing a chain of from 8 to 24 carbon atoms, $R^1$ is a member selected from the group consisting of hydrogen and lower alkyl, and M and M′ are members selected from the group consisting of alkali metals and organic substituted ammonium radicals with the proviso that at least one of M and M′ is an organic substituted ammonium radical, and (b) an amine salt of an alkyl benzene sulfonic acid in which alkyl contains from 12 to 18 carbon atoms, the weight ratio of said (a) to said (b) ingredient being from about 2 to about 20 of (a) to 1 of (b).

2. A dispersant composition, soluble in organic solvent solutions of water-insoluble biocidal toxicants, comprising (a) a compound represented by the formula $$\underset{\underset{SO_3M'}{|}}{R}-CO-\overset{\overset{R_1}{|}}{N}-C_2H_4-SO_3M$$

where R is straight chain aliphatic hydrocarbon containing from 12 to 18 carbon atoms, $R^1$ is a member selected from the group consisting of hydrogen and lower alkyl, and M and M′ are members selected from the group consisting of alkali metals and organic substituted ammonium radicals with the proviso that at least one of M and M′ is an organic substituted ammonium radical, said$SO_3M'$ being in the alpha position to said CO—, and (b) an amine salt of an alkyl benzene sulfonic acid in which alkyl contains from 12 to 18 carbon atoms, the weight ratio of said (a) to said (b) ingredient being from about 2 to about 20 of (a) to 1 of (b).

3. A dispersant composition in accordance with claim 2 wherein M is sodium and M′ is isopropylamine, and the amine salt of the alkyl benzene sulfonic acid is isopropylamine.

4. A dispersant composition, soluble in organic solvent solutions of organic water-insoluble biocidal toxicants comprising (a) a compound represented by the formula

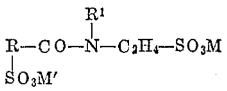

where R is a straight chain aliphatic hydrocarbon containing from 12 to 18 carbon atoms, $R^1$ is a member selected from the group consisting of hydrogen and lower alkyl, and M and M′ are members selected from the group consisting of alkali metals and organic substituted ammonium radicals with the proviso that at least one of M and M′ is an organic substituted ammonium radical, said $SO_3M'$ being in the alpha position to said CO—, and (b) an alkyl amine salt of an alkyl benzene sulfonic acid corresponding to the formula

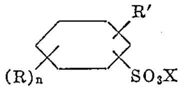

where R is alkyl containing from 1 to 3 carbon atoms, R′ is alkyl containing from 12 to 18 carbon atoms, *n* is zero to 2, and X is an organic amine action, the weight ration of said (a) to said (b) ingredient being from about 2 to about 20 of (a) to 1 of (b).

5. A dispersant composition, soluble in organic solvent solutions of organic water-insoluble biocidal toxicants, comprising (a) $C_{12}$ to $C_{18}$ an organic substituted ammonium di-salt of a sulfo fatty acid amide of N-methyl taurine, and (b) an amine salt of dodecyl benzene sulfonic acid, the weight ratio of said (a) to said (b) ingredient being from about 2 to about 20 of (a) to 1 of (b).

6. A dispersant composition, soluble in organic solvent solutions of organic water-insoluble biocidal toxicants, comprising (a) an organic substituted ammonium di-salt of α-sulfo lauric acid amide of N-methyl taurine, and (b) an amine salt of dodecyl benzene sulfonic acid, the weight ratio of said (a) to said (b) ingredient being from about 2 to about 20 of (a) to 1 of (b).

7. A dispersant composition, soluble in organic solvent solutions of organic water-insoluble biocidal toxicants, comprising (a) the half sodium half isopropylamine salt of the α-sulfo lauric acid amide of N-methyl taurine, and (b) an amine salt of dodecyl benzene sulfonic acid, the weight ratio of said (a) to said (b) ingredient being from about 2 to about 20 of (a) to 1 of (b).

8. A dispersant composition in accordance with claim 7, in which the amine salt in the (b) ingredient is the isopropylamine salt.

9. A toxicant concentrate comprising an organic solvent solution of an organic water-insoluble biocidal toxicant and containing, dissolved therein, (a) a compound represented by the formula

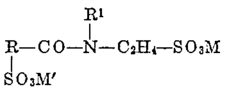

where R is higher molecular weight aliphatic containing a chain of from 8 to 24 carbon atoms, $R^1$ is a member selected from the group consisting of hydrogen and lower alkyl, and M and M′ are members selected from the group consisting of alkali metals and organic substituted ammonium radicals with the proviso that at least one of M and M′ is an organic substituted ammonium radical, and (b) an amine salt of an alkyl benzene sulfonic acid in which alkyl radical contains from 12 to 18 carbon atoms, the weight ratio of said (a) to said (b) ingredient being from about 2 to about 20 of (a) to 1 of (b), the total of said (a) and (b) ingredients constituting from 3 to 30%, by weight, of said concentrate, said concentrate being adapted, upon admixture with aqueous solutions containing upwards of 20% of fertilizer ingredients, to form a homogeneous dispersion usable for periods of the order of at least several hours.

10. A toxicant concentrate comprising an organic solvent solution of an organic water-insoluble biocidal toxicant and containing, dissolved therein, (a) a compound represented by the formula

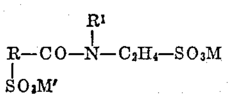

where R is straight chain aliphatic hydrocarbon containing from 12 to 18 carbon atoms, $R^1$ is a member selected from the group consisting of hydrogen and lower alkyl, and M and M′ are members selected from the group consisting of alkali metals and organic substituted ammonium radicals with the proviso that at least one of M and M′ is an organic substituted ammonium radical, said $SO_3M'$ being in the alpha position to said CO—, and (b) an amine salt of an alkyl benzene sulfonic acid in which alkyl contains from 12 to 18 carbon atoms, the weight ratio of said (a) to said (b) ingredient being from about 2 to about 20 of (a) to 1 of (b), the total of said (a) and (b) ingredients constituting from 3 to 30%, by weight, of said concentrate, said concentrate being adapted, upon admixture with aqueous solutions containing upwards of 20% of fertilizer ingredients, to form a homogeneous dispersion usable for periods of the order of at least several hours.

11. A toxicant concentrate in accordance with claim 10, wherein M and M′ are alkyl amines containing from 1 to 6 carbon atoms, the amine salt of the alkyl benzene sulfonic acid is an alkyl amine containing from 1 to 6 carbon atoms, and wherein the total of said (a) and (b) ingredients constitutes from 6 to 15% by weight, of said concentrate.

12. A toxicant concentrate in accordance with claim 10, wherein M and M′ are isopropylamine, wherein the amine salt of the alkyl benzene sulfonic acid is isopropylamine, and wherein the total of said (a) and (b) ingredients constitutes from 6 to 15%, by weight, of said concentrate.

13. A toxicant concentrate comprising an organic solvent solution of an organic water-insoluble biocidal toxicant and containing, dissolved therein, (a) an organic substituted ammonium di-salt of α-sulfo lauric acid amide of N-methyl turine, and (b) an alkyl amine salt of dodecyl benzene sulfonic acid in which alkyl contains from 1 to 6 carbon atoms, the weight ratio of said (a) to said (b) ingredient being from about 2 to about 20 of (a) to 1 of (b), the total of said (a) and (b) ingredients constituting from 6 to 15% by weight, of said concentrate, said concentrate being adapted, upon admixture with aqueous solutions containing upwards of 20% of fertilizer ingredients, to form a homogeneous dispersion usable for periods of the order of at least several hours.

14. A combination biocidal toxicant water-soluble inorganic salt fertilizer composition containing an aqueous phase comprising a water solution of said water-soluble inorganic salt fertilizer material, and a normally water-immiscible oleaginous phase comprising an organic solvent solution of said biocidal toxicant, said composition comprising a substantially homogeneous emulsion which includes, in admixture therewith, (a) a compound represented by the formula

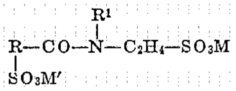

where R is higher molecular weight aliphatic containing a chain of from 8 to 24 carbon atoms, $R^1$ is a member selected from the group consisting of hydrogen and lower alkyl, and M and M′ are members selected from the group consisting of alkali metals and organic substituted ammonium radicals with the proviso that at least one of M and M′ is an organic substituted ammonium radical, and (b) an amine salt of an alkyl benzene sulfonic acid in which alkyl contains from 12 to 18 carbon atoms, the weight ratio of said (a) to said (b) ingredient being from about 2 to about 20 of (a) to 1 of (b), the total of said (a) and (b) ingredients constituting from 3 to 30%, by weight, of the water-immiscible oleaginous phase.

15. A combination biocidal toxicant water-soluble inorganic salt fertilizer composition containing an aqueous phase comprising a water solution of at least 20% of said water-soluble inorganic salt fertilizer material, and a normally water-immiscible oleaginous phase comprising an organic solvent solution of said biocidal toxicant, said composition comprising a substantially homogeneous emulsion which includes, in admixture therewith, (a) a compound represented by the formula

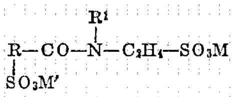

where R is straight chain aliphatic hydrocarbon containing from 12 to 18 carbon atoms, $R^1$ is a member selected from the group consisting of hydrogen and lower alkyl, and M and M′ are members selected from the group consisting of alkali metals and organic substituted ammonium radicals with the proviso that at least one of M and M′ is an organic substituted ammonium radical, said $SO_3M'$ being in the alpha position to said CO—, and (b) an amine salt of an alkyl benzene sulfonic acid in which alkyl contains from 12 to 18 carbon atoms, the weight ratio of said (a) to said (b) ingredient being from about 2 to about 20 of (a) to 1 of (b), the total of said (a) and (b) ingredients constituting from 6 to 15%, by weight, of the water-immiscible oleaginous phase.

16. A combination biocidal toxicant water-soluble inorganic salt fertilizer composition containing an aqueous phase comprising a water solution of at least 20% of said water-soluble inorganic salt fertilizer material, and a normally water-immiscible oleaginous phase comprising an organic solvent solution of said biocidal toxicant, said composition comprising a substantially homogeneous emulsion which includes, in admixture therewith, (a) an organic substituted ammonium di-salt of α-sulfo lauric acid amide of N-methyl taurine, and (b) an alkyl amine salt of an alkyl benzene sulfonic acid corresponding to the formula

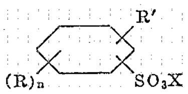

where R is alkyl containing from 1 to 3 carbon atoms, R′ is alkyl containing from 12 to 18 carbon atoms, *n* is zero to 2, and X is an organic amine cation, the weight ratio of said (a) to said (b) ingredient being from 2 to 6 of (a) to 1 of (b), the total of said (a) and (b) ingredients constituting from 3 to 30%, by weight, of the water-immiscible oleaginous phase.

References Cited by the Examiner

UNITED STATES PATENTS

| | | | |
|---|---|---|---|
| 2,558,762 | 7/1951 | Kohr | 71—2.6 XR |
| 2,806,044 | 9/1957 | Weil et al. | 260—400 |
| 2,976,208 | 3/1961 | Lindner | 167—42 |
| 2,976,209 | 3/1961 | Lindner | 167—42 |
| 2,976,211 | 3/1961 | Lindner | 167—42 |
| 3,074,791 | 1/1963 | Scoles | 71—2.6 |
| 3,080,280 | 3/1963 | Lindner | 167—42 |

ELBERT L. ROBERTS, *Acting Primary Examiner.*

JAMES O. THOMAS, JULIAN LEVITT, LEWIS GOTTS, *Examiners.*

A. J. ADAMCIK, *Assistant Examiner.*